(12) United States Patent
Sugino et al.

(10) Patent No.: US 8,475,931 B2
(45) Date of Patent: Jul. 2, 2013

(54) POLARIZER PROTECTIVE FILM, POLARIZING PLATE, AND IMAGE DISPLAY APPARATUS

(75) Inventors: Youichirou Sugino, Osaka (JP); Tsuyoshi Chiba, Osaka (JP); Tsutomu Hani, Osaka (JP); Naoki Tomoguchi, Osaka (JP)

(73) Assignees: Nitto Denko Corporation, Ibaraki-shi, Osaka (JP); Nippon Shokubai Co., Ltd., Osaka-shi, Osaka (JP)

( * ) Notice: Subject to any disclaimer, the term of this patent is extended or adjusted under 35 U.S.C. 154(b) by 327 days.

(21) Appl. No.: 12/439,674

(22) PCT Filed: Jul. 19, 2007

(86) PCT No.: PCT/JP2007/064223
§ 371 (c)(1),
(2), (4) Date: Mar. 2, 2009

(87) PCT Pub. No.: WO2008/026396
PCT Pub. Date: Mar. 6, 2008

(65) Prior Publication Data
US 2010/0002298 A1    Jan. 7, 2010

(30) Foreign Application Priority Data
Sep. 1, 2006 (JP) .................................. 2006-237422

(51) Int. Cl.
*B32B 27/30* (2006.01)
*G02B 5/30* (2006.01)
*G02B 27/28* (2006.01)

(52) U.S. Cl.
USPC ....................... 428/522; 428/523; 359/485.03

(58) Field of Classification Search
USPC ........................................................ 428/522
See application file for complete search history.

(56) References Cited

U.S. PATENT DOCUMENTS

| 6,512,562 B1 | 1/2003 | Kobayashi et al. |
| 6,900,937 B2 | 5/2005 | Saiki et al. |
| 2003/0004278 A1 * | 1/2003 | Asano et al. ............... 525/330.6 |
| 2003/0021025 A1 | 1/2003 | Saiki et al. |
| 2007/0285777 A1 | 12/2007 | Toyoshima et al. |

FOREIGN PATENT DOCUMENTS

| CN | 1399148 A | 2/2003 |
| JP | 09-241323 A | 9/1997 |
| JP | 2000-356714 A | 12/2000 |
| JP | 2002-98830 A | 4/2002 |

(Continued)

OTHER PUBLICATIONS

English machine translation of Yoshimi, JP 2002-098830 (2002).*

(Continued)

*Primary Examiner* — Peter F Godenschwager
(74) *Attorney, Agent, or Firm* — Westerman, Hattori, Daniels & Adrian, LLP

(57) ABSTRACT

Provided are a polarizer protective film containing a (meth) acrylic resin as a main component and being excellent in adhesion with a polarizer, a polarizing plate including the polarizer protective film and a polarizer which are unlikely to peel off from each other, and an image display apparatus of high quality using the polarizing plate. The polarizer protective film of the present invention includes a coating layer containing a (meth)acrylic resin (B) as a main component on at least one surface of a film containing a (meth)acrylic resin (A) as a main component.

10 Claims, 2 Drawing Sheets

FOREIGN PATENT DOCUMENTS

| | | |
|---|---|---|
| JP | 2002-258051 A | 9/2002 |
| JP | 2004-168882 A | 6/2004 |
| JP | 2004-226799 A | 8/2004 |
| JP | 2005-146084 A | 6/2005 |
| JP | 2005-189623 A | 7/2005 |
| JP | 2006-96960 A | 4/2006 |
| JP | 2006-126585 A | 5/2006 |
| WO | 2006-025445 A1 | 3/2006 |
| WO | 2006/051783 A1 | 5/2006 |

OTHER PUBLICATIONS

International Search Report of PCT/JP2007/064223; Mailing Date of Aug. 21, 2007.

Chinese Office Action dated Jun. 15, 2011, issued in corresponding Chinese Patent Application No. 200780032480.8.

Taiwanese Office Action dated Jul. 26, 2012, issued in corresponding Taiwanese patent application No. 096129067, with English translation.

Korean Office Action dated Feb. 28, 2012, issued in corresponding Korean Patent Application No. 2011-7030900, (17 pages).

Korean Office Action dated Sep. 26, 2012, issued in corresponding Korean Patent Applocation No. 2011-7030900, with English translation (18 pages).

Japanese Office Action dated Jan. 23, 2013, issued in corresponding Japanese Patent Application No. 2006-237422, with English translation (5 pages).

* cited by examiner

POLARIZER PROTECTIVE FILM, POLARIZING PLATE, AND IMAGE DISPLAY APPARATUS

TECHNICAL FIELD

The present invention relates to a polarizer protective film, a polarizing plate, and an image display apparatus such as a liquid crystal display apparatus, an organic EL display apparatus, or a PDP including at least the one polarizing plate.

BACKGROUND ART

A liquid crystal display apparatus must have polarizing plates arranged on both sides of a glass substrate forming the surface of a liquid crystal panel due to its image forming system. Such a polarizing plate to be used is generally manufactured by attaching a polarizer protective film formed of a cellulose-based resin film such as triacetyl cellulose on both sides of a polarizer made of a polyvinyl alcohol-based film and a dichromatic substance such as iodine by using a polyvinyl alcohol-based adhesive.

The cellulose-based resin film has insufficient heat and humidity resistance and thus has a problem in that properties such as a degree of polarization and a hue of a polarizing plate degrade when a polarizing plate using the cellulose-based resin film as a polarizer protective film is used under high temperature or high humidity conditions. Further, the cellulose-based resin film causes retardation with respect to incident light in an oblique direction. With the increase in size of a liquid crystal display in recent years, the retardation has had significant effects on viewing angle properties.

As a resin material excellent in heat resistance and optical transparency, a (meth)acrylic resin such as polymethylmethacrylate is well known, and it is reported that the (meth)acrylic resin is used as a polarizer protective film (see, for example, Patent Documents 1 and 2). However, in the case where the (meth)acrylic resin is formed into a film, a brittle layer is likely to be formed in the vicinity of the surface of the film. Due to the presence of the brittle layer, when the polarizer protective film made of the (meth)acrylic resin is attached to a polarizer, sufficient adhesion cannot be expressed, and there is a problem in that the polarizer protective film and the polarizer are likely to peel off from each other.

Patent Document 1: JP 2000-356714 A
Patent Document 2: JP 2002-258051 A

DISCLOSURE OF THE INVENTION

Problem to be Solved by the Invention

The present invention has been made in view of solving the above-mentioned conventional problem, and an object of the present invention is to provide: (1) a polarizer protective film containing a (meth)acrylic resin as a main component and being excellent in adhesion with a polarizer; (2) a polarizing plate including such a polarizer protective film and a polarizer which are unlikely to peel off from each other; and (3) an image display apparatus of high quality using such a polarizing plate.

Means for Solving the Problems

A polarizer protective film of the present invention includes a coating layer containing a (meth)acrylic resin (B) as a main component on at least one surface of a film containing a (meth)acrylic resin (A) as a main component.

In a preferred embodiment, a thickness of the coating layer is 0.005 µm to 3 µm.

In a preferred embodiment, the (meth)acrylic resin (A) and the (meth)acrylic resin (B) are the same kind of resins.

In a preferred embodiment, the film containing a (meth)acrylic resin (A) as a main component is obtained by melt-extrusion.

In a preferred embodiment, the coating layer is obtained by applying an application liquid obtained by dissolving a (meth)acrylic resin (B) in a solvent.

According to another aspect of the present invention, a polarizing plate is provided. The polarizing plate of the present invention includes a polarizer on one surface side of the polarizer protective film of the present invention, the surface side having a coating layer.

In a preferred embodiment, the polarizing plate includes an adhesive layer between the coating layer and the polarizer.

In a preferred embodiment, the polarizing plate includes an easy adhesion layer between the coating layer and the adhesive layer.

In a preferred embodiment, the polarizing plate includes a cellulose-based resin film on a surface side of the polarizer opposite to the polarizer protective film.

In a preferred embodiment, the polarizing plate further includes a pressure-sensitive adhesive layer as at least one of an outermost layer.

According to another aspect of the present invention, an image display apparatus is provided. The image display apparatus includes at least one polarizing plate of the present invention.

Effects of the Invention

According to the present invention, a polarizer protective film containing a (meth)acrylic resin as a main component and being excellent in adhesion with a polarizer can be provided.

In a conventional polarizer protective film containing a (meth)acrylic resin such as polymethyl methacrylate as a main component, a brittle layer was likely to be formed in the vicinity of the surface of the film when the (meth)acrylic resin was formed into the film, and hence sufficient adhesion with a polarizer was not expressed. According to the present invention, on at least one surface of a film containing a (meth)acrylic resin as a main component, a coating layer containing, as a main component, a (meth)acrylic resin that is the same kind as or a different kind from the above-mentioned (meth)acrylic resin is provided, whereby providing a polarizer protective film excellent in adhesion with a polarizer has been achieved.

According to the present invention, a polarizing plate including the polarizer protective film as described above and the polarizer can be provided, and the polarizer protective film excellent in adhesion with the polarizer is used, and hence the polarizer protective film and the polarizer are very unlikely to peel off from each other. Further, according to the present invention, an image display apparatus of high quality using the above-mentioned polarizing plate can be provided.

Figure 1:
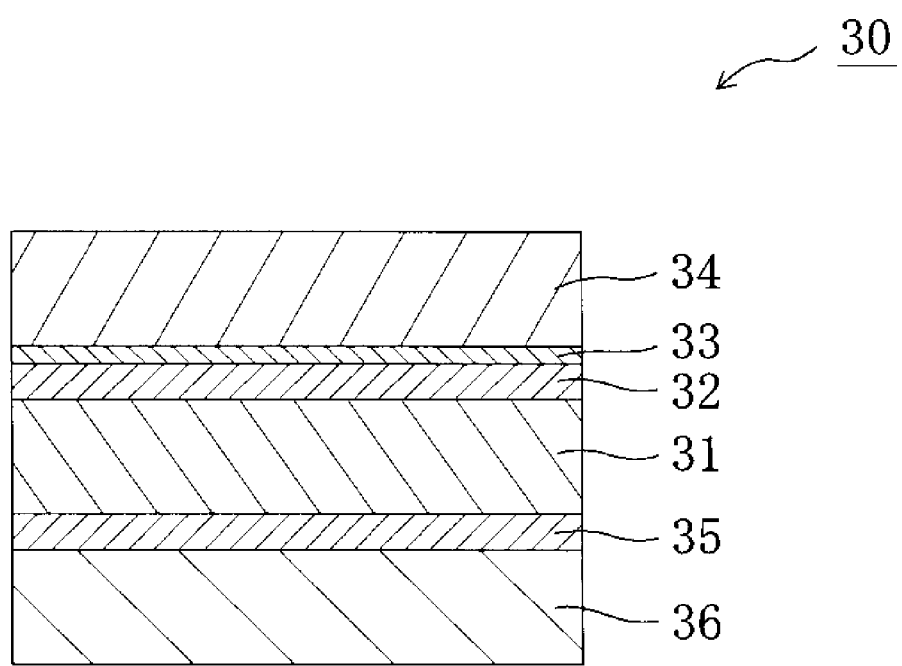
FIG. 1 A cross-sectional view illustrating an example of a polarizing plate of the present invention.

DESCRIPTION OF SYMBOLS 10 liquid crystal cell
11, 11' glass substrate
12 liquid crystal layer
13 spacer
20, 20' retardation film
30, 30' polarizing plate
31 polarizer
32 adhesive layer
33 easy adhesion layer
34 polarizer protective film
35 adhesive layer
36 polarizer protective film
40 light guide plate
50 light source
60 reflector
100 liquid crystal display apparatus

BEST MODE FOR CARRYING OUT THE INVENTION

Hereinafter, description will be given of preferred embodiments of the present invention, but the present invention is not limited to the embodiments.

[Polarizer Protective Film]

A polarizer protective film according to the present invention includes a film containing a (meth)acrylic resin (A) as a main component. Further, the polarizer protective film according to the present invention includes a coating layer containing a (meth)acrylic resin (B) as a main component.

The (meth)acrylic resin (A) and the (meth)acrylic resin (B) may be different kinds of resins or the same kind of resins. In terms of the compatibility between resins and the expression of sufficient effects of the present invention, it is preferred that the (meth)acrylic resin (A) and the (meth)acrylic resin (B) be the same kind of resins.

The (meth)acrylic resins (A) and (B) may be respectively made of one kind of resin or at least two kinds of resins.

The Tg (glass transition temperature) of the above-mentioned (meth)acrylic resins (A) and (B) is preferably 115° C. or higher, more preferably 120° C. or higher, still more preferably 125° C. or higher, and particularly preferably 130° C. or higher. By including a (meth)acrylic resin having a Tg (glass transition temperature) of 115° C. or higher as a main component, for example, in a case where the (meth)acrylic resin having such a Tg is finally incorporated in a polarizing plate, the polarizing plate is likely to have excellent durability. The upper limit value of the Tg of the above-mentioned (meth)acrylic resins is not particularly limited. However, it is preferably 170° C. or lower in view of a forming property.

Although not particularly limited, examples of the above-mentioned (meth)acrylic resins (A) and (B) include a poly(meth)acrylic ester such as polymethylmethacrylate, a methyl methacrylate-(meth)acrylic acid copolymer, a methyl methacrylate-(meth)acrylic ester copolymer, a methyl methacrylate-acrylic ester-(meth)acrylic acid copolymer, a methyl (meth)acrylate-styrene copolymer (MS resin, etc.), and a polymer having an alicyclic hydrocarbon group (e.g., a methyl methacrylate-cyclohexyl methacrylate copolymer, a methyl methacrylate-norbornyl(meth)acrylate copolymer, etc.). Examples of the (meth)acrylic resins include preferably a (meth)acrylic $C_{1-6}$ alkyl-based resin containing as a main component a poly(meth)acrylic $C_{1-6}$ alkyl (50 to 100% by weight, preferably 70 to 100% by weight) such as polymethyl (meth)acrylate, and particularly preferably methyl methacrylate-based resin containing as a main component methyl methacrylate (50 to 100% by weight, preferably 70 to 100% by weight).

Specific examples of the above-mentioned (meth)acrylic resins (A) and (B) include ACRYPET VH and ACRYPET VRL20A manufactured by Mitsubishi Rayon Co., Ltd., a (meth)acrylic resin having a ring system in the molecule described in JP 2004-70296 A, and a (meth)acrylic resin having high Tg obtained by intramolecular cross-linking and intramolecular cyclization.

In the present invention, as the (meth)acrylic resins (A) and (B), there may be used (meth)acrylic resins having a lactone ring system described in JP 2000-230016 A, JP 2001-151814 A, and JP 2005-146084 A, and a (meth)acrylic resin having a glutaric anhydride structure described in JP 2005-314534 A or the like.

The content of the (meth)acrylic resin (A) in a film containing the (meth)acrylic resin (A) as a main component is preferably 50 to 99% by weight, more preferably 60 to 98% by weight, and much more preferably 70 to 97% by weight. In the case where the content of the (meth)acrylic resin (A) is less than 50% by weight, there is a possibility that the high heat resistance and high transparency originally owned by a (meth)acrylic resin may not be reflected sufficiently. In the case where the content of the (meth)acrylic resin (A) exceeds 99% by weight, mechanical strength may be degraded.

The content of the (meth)acrylic resin (B) in a coating layer containing the (meth)acrylic resin (B) as a main component is preferably 50 to 99% by weight, more preferably 60 to 98% by weight, and much more preferably 70 to 97% by weight. In the case where the content of the (meth)acrylic resin (B) is less than 50% by weight, there is a possibility that the high heat resistance and high transparency originally owned by a (meth)acrylic resin may not be reflected sufficiently. In the case where the content of the (meth)acrylic resin (B) exceeds 99% by weight, mechanical strength may be degraded.

A film containing the (meth)acrylic resin (A) as a main component and a coating layer containing the (meth)acrylic resin (B) as a main component may respectively contain any suitable other components. Specific examples of the other components include a UV absorber, and general compounding agents such as a stabilizer, a lubricant, a processing aid, a plasticizer, a shock resistant aid, a retardation reducing agent, a flatting agent, an antimicrobial agent, and a fungicide.

As the optical properties of the polarizer protective film, there is a problem in magnitude of retardations in front and thickness directions. Therefore, it is preferred that the polarizer protective film of the present invention contain a retardation reducing agent. Specifically, the film containing the (meth)acrylic resin (A) as a main component and the coating layer containing the (meth)acrylic resin (B) as a main component contain the retardation reducing agent. As the retardation reducing agent, for example, a styrene-containing polymer such as an acrylonitrile-styrene copolymer is preferred. The adding amount of the retardation reducing agent is preferably 30% by weight or less, more preferably 25% by weight or less, and much more preferably 20% by weight or less, with respect to the total amount of the (meth)acrylic resins (A) and (B) in the polarizer protective film. The addition of the retardation reducing agent in an amount exceeding the above range may scatter visible light and impair transparency, with the result that the polarizer protective film may lack its properties.

As the thickness of the film containing the (meth)acrylic resin (A) as a main component, any suitable thickness can be adopted as long as the object of the present invention can be achieved. The thickness is preferably 5 µm to 100 µm, and more preferably 25 µm to 80 µm.

As the thickness of the coating layer containing the (meth) acrylic resin (B) as a main component, any suitable thickness can be adopted as long as the object of the present invention can be achieved. The thickness is preferably 0.005 µm to 3 µm, and more preferably 0.05 µm to 2 µm.

As the thickness of the polarizer protective film of the present invention, any suitable thickness can be adopted as long as the object of the present invention can be achieved. The thickness is preferably 20 to 200 µm, more preferably 25 to 180 µm, and much more preferably 30 to 140 µm. When the thickness of the polarizer protective film is 20 µm or more, the polarizer protective film has appropriate strength and rigidity and can be handled satisfactorily during secondary processing such as lamination and printing. Further, the retardation occurring due to the stress during take-up can be controlled easily, and the film can be produced stably and easily. When the thickness of the polarizer protective film is 200 µm or less, the film can be easily wound up, and a line speed, productivity, and controllability become satisfactory.

The film containing the (meth)acrylic resin (A) as a main component may be stretched by longitudinal stretching and/or lateral stretching. The film is stretched by longitudinal stretching and/or lateral stretching, whereby excellent optical properties can be given, mechanical strength is enhanced, and productivity and reworking property can be improved.

The above-mentioned stretching may be the one (free-end uniaxial stretching) only by longitudinal stretching or the one (fixed-end uniaxial stretching) only by lateral stretching. However, it is preferably sequential stretching or simultaneous biaxial stretching with a longitudinal stretching magnification of 1.1 to 3.0 times and a lateral stretching magnification of 1.1 to 3.0 times. According to the stretching (free-end uniaxial stretching) only by longitudinal stretching and stretching (fixed-end uniaxial stretching) only by lateral stretching, the film strength increases only in the stretching direction, and the strength does not increase in a direction perpendicular to the stretching direction, so there is a possibility that sufficient film strength cannot be obtained as the entire film. The above-mentioned longitudinal stretching magnification is more preferably 1.2 to 2.5 times, and still more preferably 1.3 to 2.0 times. The above-mentioned lateral stretching magnification is more preferably 1.2 to 2.5 times, and still more preferably 1.4 to 2.5 times. In the case where the longitudinal stretching magnification and the lateral stretching magnification are less than 1.1 times, the stretching magnification is too low, so there may be substantially no effects of stretching. When the longitudinal stretching magnification and the lateral stretching magnification exceed 3.0 times, stretch breaking is likely to occur due to the problem of smoothness of a film end face.

The above-mentioned stretching temperature is preferably the Tg to (Tg+30° C.) of a film to be stretched. When the above-mentioned stretching temperature is lower than the Tg, the film may be broken. When the above-mentioned stretching temperature exceeds (Tg+30° C.), the film may start melting, making it difficult to perform threading.

The film containing the (meth)acrylic resin (A) as a main component is preferably obtained by melt extrusion. The reason for this is as follows. In the film obtained by melt extrusion, a brittle layer is likely to be formed in the vicinity of the surface of the film due to the temperature difference between the vicinity of the surface of the film and the inside of the film during extrusion, and hence the effect of the present invention is expressed further by providing the coating layer containing the (meth)acrylic resin (B) as a main component.

As a specific example of a method of forming a film by the above melt extrusion, there is given the following method: supplying a resin composition as a material to an extruder connected to a T-die, followed by melt kneading, extrusion, water-cooling, and withdrawing. The extruder may be of a monoaxial or biaxial screw type, and an additive such as a plasticizer or an antioxidant may be added.

The temperature for the melt extrusion can be set appropriately, and when the glass transition temperature of a resin composition as a material is Tg(° C.), (Tg+80)° C. to (Tg+180)° C. is preferred, and (Tg+100)° C. to (Tg+150)° C. is more preferred. When the temperature for extrusion molding is too low, the resin may not be formed due to lack of flowability. When the temperature for extrusion molding is too high, the viscosity of the resin becomes low, which may cause a problem in production stability such as non-uniform thickness of a formed product.

The coating layer containing the (meth)acrylic resin (B) as a main component is preferably obtained by applying an application liquid obtained by dissolving the (meth)acrylic resin (B) in a solvent.

As the above solvent, ketones such as acetone, methyl ethyl ketone, methyl isobutyl ketone, methyl-n-amyl ketone, cyclohexanone, diacetone alcohol, diisobutyl ketone, and methyl cyclohexanone, esters such as methyl acetate, ethyl acetate, ethyl lactate, butyl lactate, ethyl benzoate, and methyl acetoacetate; ethers such as dioxolane, dioxane, methyl cellosolve, and methyl carbitol, polyhydric alcohol esters such as methyl cellosolve acetate and cellosolve acetate; furans such as tetrahydrofuran and furfural, acids such as a glacial acetic acid, halogen hydrocarbons such as methylene chloride, ethylene dichloride, and tetrachloroethane, nitrogen compounds such as nitromethane, nitroethane, pyridine, dimethyl formamide, and nitrobenzene, and sulfonic acids such as dimethyl sulfoxide are suitably used. In view of drying after the coating, a solvent which easily volatile is preferred, and specifically, a solvent having a boiling point of 200° C. or lower is preferred. One kind of the solvent may be used and two or more kinds of the solvents may be used in combination.

The coating layer containing the (meth)acrylic resin (B) as a main component may or may not contain the above-mentioned solvent. As the case where the coating layer does not contain the solvent, for example, there is a case where the solvent is volatilized by natural drying or forced drying.

As a method of applying the application liquid, any suitable method can be adopted. For example, the application liquid is applied by a coating system such as a wire bar system, a doctor blade system, a soaking system, or the like, and then, if required, the application liquid is dried naturally or forcefully.

As the use amount of the solvent, any suitable amount that is capable of dissolving the (meth)acrylic resin (B) can be adopted depending upon the kind of the (meth)acrylic resin (B).

As the coating amount of the application liquid, any suitable coating amount can be adopted as long as the thickness of a coating layer to be formed will not impair the object of the present invention.

The polarizer protective film of the present invention may have any configuration, as long as the coating layer containing the (meth)acrylic resin (B) as a main component is provided on at least one surface of the film containing the (meth) acrylic resin (A) as a main component. Preferably, the polarizer protective film has a configuration in which the coating layer containing the (meth)acrylic resin (B) as a main component is provided on one surface of the film containing the (meth)acrylic resin (A) as a main component. Further, the polarizer protective film of the present invention may, for example, further include any other suitable layer.

In the polarizer protective film of the present invention, YI in a thickness of 80 μm is preferably 1.3 or less, more preferably 1.27 or less, much more preferably 1.25 or less, still more preferably 1.23 or less, and particularly preferably 1.20 or less. When the YI in the thickness of 80 μm exceeds 1.3, excellent optical transparency may not be exhibited. Note that the YI can be obtained, for example, by the following expression based on tristimulus values (X, Y, Z) of a color obtained by measurement, using a high-speed integrating-sphere spectral transmittance meter (DOT-3C (trade name), manufactured by Murakami Color Research Laboratory Instruments).

$$YI=[(1.28X-1.06Z)/Y]\times 100$$

A b-value (scale of a hue in accordance with a Hunter-color system) in a thickness of 80 μm of the polarizer protective film of the present invention is preferably less than 1.5, and more preferably 1.0 or less. In the case where the b-value is 1.5 or more, excellent optical transparency may not be exhibited due to the coloring of a film. Note that the b-value can be obtained, for example, by cutting a polarizer protective film sample into pieces each having 3 cm per side and measuring the hue thereof using the high-speed integrating-sphere spectral transmittance meter (DOT-3C (trade name), manufactured by Murakami Color Research Laboratory Instruments). The hue can be evaluated based on the b-value in accordance with the Hunter-color system.

In the polarizer protective film of the present invention, an in-plane retardation Δnd is preferably 3.0 nm or less and more preferably 1.0 nm or less. When the in-plane retardation Δnd exceeds 3.0 nm, excellent optical properties may not be exhibited.

In the polarizer protective film of the present invention, a thickness direction retardation Rth is preferably 5.0 nm or less and more preferably 3.0 nm or less. When the thickness direction retardation Rth exceeds 5.0 nm, excellent optical properties may not be exhibited.

In the polarizer protective film of the present invention, moisture permeability is preferably 100 g/m²·24 hr or less and more preferably 60 g/m²·24 hr or less. When the moisture permeability exceeds 100 g/m²·24 hr, moisture resistance may be degraded.

The polarizer protective film of the present invention also preferably has excellent mechanical strength. The tensile strength in an MD direction is preferably 65 N/mm² or more, more preferably N/mm² or more, still more preferably 75 N/mm² or more, and particularly preferably 80 N/mm² or more. The tensile strength in a TD direction is preferably 45 N/mm² or more, more preferably 50 N/mm² or more, still more preferably 55 N/mm² or more, and particularly preferably 60 N/mm² or more. The tensile elongation in an MD direction is preferably 6.5% or more, more preferably 7.0% or more, still more preferably 7.5% or more, and particularly preferably 8.0% or more. The tensile elongation in a TD direction is preferably 5.0% or more, more preferably 5.5% or more, still more preferably 6.0% or more, and particularly preferably 6.5% or more. In the case where the tensile strength or the tensile elongation is out of the above ranges, the excellent mechanical strength may not be exhibited.

The haze representing optical transparency of the polarizer protective film of the present invention is preferably as low as possible, and is preferably 5% or less, more preferably 3% or less, and still more preferably 1.5% or less, and particularly preferably 1% or less. When the haze is 5% or less, the film can be visually provided with satisfactory clear feeling. When the haze is 1.5% or less, even if the polarizer protective film is used as a lighting member such as a window, both visibility and lighting property are obtained, and even if the polarizer protective film is used as a front plate of a display apparatus, display contents can be visually recognized satisfactorily. Thus, the polarizer protective film with such a haze has a high industrial use value.

The polarizer protective film of the present invention can be used by being laminated onto, for example, a lighting member for construction, such as a window and a carport roof member, a lighting member for a vehicle, such as a window, a lighting member for agriculture, such as a greenhouse, an illumination member, a display member such as a front filter, or the like, in addition to the application to the protection of a polarizer. Further, the polarizer protective film of the present invention can also be used by being laminated on to a package of consumer electronics, an interior member in a vehicle, a construction material for an interior, a wall paper, a decorative laminate, a hallway door, a window frame, a foot stall, and the like, which have been covered with a (meth)acrylic resin film conventionally.

[Polarizing Plate]

A polarizing plate of the present invention has a polarizer on one surface side of the polarizer protective film of the present invention, the surface side having a coating layer.

In one preferred embodiment of the polarizing plate of the present invention, as shown in FIG. 1, one surface of a polarizer 31 is attached to a surface side of a polarizer protective film 34 of the present invention having the coating layer via an adhesive layer 32 and an easy adhesion layer 33, and the other surface of the polarizer 31 is attached to a polarizer protective film 36 via an adhesive layer 35. The polarizer protective film 36 may be the polarizer protective film of the present invention or any other suitable polarizer protective film. The polarizer protective film 36 is preferably a cellulose-based resin film, and triacetyl cellulose is preferred in terms of transparency and adhesion. The thickness of the cellulose-based resin film is preferably 30 to 100 μm and more preferably 40 to 80 μm.

As the polarizer, there can be used a polarizer manufactured by: coloring a polyvinyl alcohol-based resin film with a dichromatic substance (typically, iodine or a dichromatic dye); and uniaxially stretching the film. The degree of polymerization of the polyvinyl alcohol-based resin for forming the polyvinyl alcohol-based resin film is preferably 100 to 5,000, and more preferably 1,400 to 4,000. The polyvinyl alcohol-based resin film for forming the polarizer may be formed by any appropriate method (such as a flow casting method involving film formation through flow casting of a solution containing a resin dissolved in water or an organic solvent, a casting method, or an extrusion method). The thickness of the polarizer may be appropriately set in accordance with the purpose and application of LCD employing the polarizing plate, but is typically 5 to 80 μm.

For producing a polarizer, any appropriate method may be employed in accordance with the purpose, materials to be used, conditions, and the like. Typically, employed is a method in which the polyvinyl alcohol-based resin film is subjected to a series of production steps including swelling, coloring, cross-linking, stretching, water washing, and drying steps. In each of the treatment steps excluding the drying step, the polyvinyl alcohol-based resin film is immersed in a bath containing a solution to be used in each step. The order, number of times, and absence or presence of swelling, coloring, cross-linking, stretching, water washing, and drying steps may be appropriately set in accordance with the purpose, materials to be used, conditions, and the like. For example, several treatments may be conducted at the same time in one step, or specific treatments may be omitted. More specifically, stretching treatment, for example, may be conducted after coloring treatment, before coloring treatment, or at the same time as swelling treatment, coloring treatment, and cross-linking treatment. Further, for example, the cross-linking treatment can be preferably conducted before and after the stretching treatment. Further, for example, water-washing treatment may be conducted after each treatment or only after specific treatments.

The swelling step is typically conducted by immersing the polyvinyl alcohol-based resin film in a treatment bath (swelling bath) filled with water. This treatment washes away contaminants from a surface of the polyvinyl alcohol-based resin film, washes away an anti-blocking agent, and swells the polyvinyl alcohol-based resin film, to thereby prevent non-uniformity such as uneven coloring. The swelling bath may appropriately contain additionally glycerin, potassium iodide, or the like. The temperature of the swelling bath is typically about 20 to 60° C., and the immersion time in the swelling bath is typically about 0.1 to 10 minutes.

The coloring step is typically conducted by immersing the polyvinyl alcohol-based resin film in a treatment bath (coloring bath) containing a dichromatic substance such as iodine. As a solvent to be used for a solution of the coloring bath, water is generally used, but an appropriate amount of an organic solvent having compatibility with water may be added. The dichromatic substance is typically used in a ratio of 0.1 to 1.0 part by weight with respect to 100 parts by weight of the solvent. In the case where iodine is used as a dichromatic substance, the solution of the coloring bath preferably further contains an assistant such as an iodide for improving a coloring efficiency. The assistant is used in a ratio of preferably 0.02 to 20 parts by weight, and more preferably 2 to 10 parts by weight, with respect to 100 parts by weight of the solvent. Specific examples of the iodide include potassium iodide, lithium iodide, sodium iodide, zinc iodide, aluminum iodide, lead iodide, copper iodide, barium iodide, calcium iodide, tin iodide, and titanium iodide. The temperature of the coloring bath is typically about 20 to 70° C., and the immersion time in the coloring bath is typically about 1 to 20 minutes.

The cross-linking step is typically conducted by immersing in a treatment bath (cross-linking bath) containing a cross-linking agent the polyvinyl alcohol-based resin film that has undergone the coloring treatment. The cross-linking agent employed may be any appropriate cross-linking agent. Specific examples of the cross-linking agent include: a boron compound such as boric acid or borax; glyoxal; and glutaraldehyde. The cross-linking agent may be used alone or in combination. As a solvent to be used for a solution of the cross-linking bath, water is generally used, but an appropriate amount of an organic solvent having compatibility with water may be added. The cross-linking agent is typically used in a ratio of 1 to 10 parts by weight with respect to 100 parts by weight of the solvent. In the case where a concentration of the cross-linking agent is less than 1 part by weight, sufficient optical properties are often not obtained. In the case where the concentration of the cross-linking agent is more than 10 parts by weight, stretching force to be generated on the film during stretching increases and a polarizing plate to be obtained may shrink. The solution of the cross-linking bath preferably further contains an assistant such as an iodide for obtaining uniform properties in the in-plane. The concentration of the assistant is preferably 0.05 to 15 wt %, and more preferably 0.5 to 8 wt %. Specific examples of the iodide are the same as that in the case of the coloring step. The temperature of the cross-linking bath is typically about 20 to 70° C., and preferably 40 to 60° C. The immersion time in the cross-linking bath is typically about 1 second to 15 minutes, and preferably 5 seconds to 10 minutes.

The stretching step may be conducted at any stage as described above. Specifically, the stretching step may be conducted after the coloring treatment, before the coloring treatment, at the same time as the swelling treatment, the coloring treatment, and the cross-linking treatment, or after the cross-linking treatment. A cumulative stretching ratio of the polyvinyl alcohol-based resin film must be 5 times or more, preferably 5 to 7 times, and more preferably 5 to 6.5 times. In the case where the cumulative stretching ratio is less than 5 times, a polarizing plate having a high degree of polarization may be hard to obtain. In the case where the cumulative stretching ratio is more than 7 times, the polyvinyl alcohol-based resin film (polarizer) may easily break. A specific method of stretching employed may be any appropriate method. For example, in the case where a wet stretching method is employed, a polyvinyl alcohol-based resin film is stretched in a treatment bath (stretching bath) at a predetermined ratio. A solution of the stretching bath to be preferably used is a solution in which various metal salts or compounds of iodine, boron, or zinc are added to a solvent such as water or an organic solvent (such as ethanol).

The water washing step is typically conducted by immersing in a treatment bath (water washing bath) the polyvinyl alcohol-based resin film that has undergone the various treatments. The water washing step allows washing away of unnecessary remains from the polyvinyl alcohol-based resin film. The water washing bath may contain pure water or an aqueous solution containing iodide (such as potassium iodide or sodium iodide). The concentration of an iodide aqueous solution is preferably 0.1 to 10 mass %. The iodide aqueous solution may contain an assistant such as zinc sulfate or zinc chloride. The temperature of the water washing bath is preferably 10 to 60° C., and more preferably 30 to 40° C., and the immersion time is typically 1 second to 1 minute. The water washing step may be conducted only once, or may be conducted a plurality of times as required. In the case where the water washing step is conducted a plurality of times, the kind and concentration of the additive contained in the water washing bath to be used for each treatment may appropriately be adjusted. For example, the water washing step includes a step of immersing a polymer film in a potassium iodide aqueous solution (0.1 to 10 mass %, 10 to 60° C.) and a step of rinsing the polymer film with pure water.

The drying step may employ any appropriate drying method (such as natural drying, air drying, or heat drying). For example, in heat drying, a drying temperature is typically 20 to 80° C., and a drying time is typically 1 to 10 minutes. In such a manner as described above, the polarizer is obtained.

The polarizing plate of the present invention includes the polarizer and the polarizer protective film of the present invention, and it is preferred that the polarizing plate have an adhesive layer between the surface side having a coating layer of the polarizer protective film of the present invention and the polarizer.

The adhesive layer is preferably formed of a polyvinyl alcohol-based adhesive. The polyvinyl alcohol-based adhesive contains a polyvinyl alcohol-based resin and a cross-linking agent.

Examples of the above-mentioned polyvinyl alcohol-based resin include without particular limitation: a polyvinyl alcohol obtained by saponifying polyvinyl acetate; derivatives thereof; a saponified product of a copolymer obtained by copolymerizing vinyl acetate with a monomer having copolymerizability with vinyl acetate; and a modified polyvinyl alcohol obtained by modifying polyvinyl alcohol to acetal, urethane, ether, graft polymer, phosphate, or the like. Examples of the monomer include: unsaturated carboxylic acids such as maleic acid (anhydrides), fumaric acid, crotonic acid, itaconic acid, and (meth)acrylic acid and esters thereof; α-olefin such as ethylene and propylene; sodium (meth)allyl-sulfonate; sodium sulfonate (monoalkylmalate); sodium disulfonate alkylmalate; N-methylol acrylamide; alkali salts of acrylamide alkylsulfonate; N-vinylpyrrolidone; and derivatives of N-vinylpyrrolidone. The polyvinyl alcohol-based resins may be used alone or in combination.

The polyvinyl alcohol-based resin has, from the viewpoint of adhesion, an average degree of polymerization of preferably 100 to 3,000, and more preferably 500 to 3,000, and an average degree of saponification of preferably 85 to 100 mol %, and more preferably to 100 mol %.

A polyvinyl alcohol-based resin having an acetoacetyl group may be used as the above-mentioned polyvinyl alcohol-based resin. The polyvinyl alcohol-based resin having an acetoacetyl group is a highly reactive functional group and is preferred from the viewpoint of improving durability of a polarizing plate.

The polyvinyl alcohol-based resin having an acetoacetyl group is obtained in a reaction between the polyvinyl alcohol-based resin and diketene through a known method. Examples of the known method include: a method involving dispersing the polyvinyl alcohol-based resin in a solvent such as acetic acid, and adding diketene thereto; and a method involving dissolving the polyvinyl alcohol-based resin in a solvent such as dimethylformamide or dioxane, in advance, and adding diketene thereto. Another example of the known method is a method involving directly bringing diketene gas or a liquid diketene into contact with polyvinyl alcohol.

A degree of acetoacetyl modification of the polyvinyl alcohol-based resin having an acetoacetyl group is not particularly limited as long as it is 0.1 mol % or more. A degree of acetoacetyl modification of less than 0.1 mol % provides insufficient water resistance with the adhesive layer and is inappropriate. The degree of acetoacetyl modification is preferably 0.1 to 40 mol %, and more preferably 1 to 20 mol %. A degree of acetoacetyl modification of more than 40 mol % decreases the number of reaction sites with a cross-linking agent and provides a small effect of improving the water resistance. The degree of acetoacetyl modification is a value measured by NMR.

As the above-mentioned cross-linking agent, the one used for a polyvinyl alcohol-based adhesive can be used without particular limitation.

A compound having at least two functional groups each having reactivity with a polyvinyl alcohol-based resin can be used as the cross-linking agent. Examples of the compound include: alkylene diamines having an alkylene group and two amino groups such as ethylene diamine, triethylene amine, and hexamethylene dimamine (of those, hexamethylene diamine is preferred); isocyanates such as tolylene diisocyanate, hydrogenated tolylene diisocyanate, a trimethylene propane tolylene diisocyanate adduct, triphenylmethane triisocyanate, methylene bis(4-phenylmethanetriisocyanate), isophorone diisocyanate, and ketoxime blocked compounds and phenol blocked compounds thereof; epoxies such as ethylene glycol diglycidyl ether, polyethylene glycol diglycidyl ether, glycerin di- or triglycidyl ether, 1,6-hexane diol diglycidyl ether, trimethylol propane triglycidyl ether, diglycidyl aniline, and diglycidyl amine; monoaldehydes such as formaldehyde, acetaldehyde, propione aldehyde, and butyl aldehyde; dialdehydes such as glyoxal, malondialdehyde, succinedialdehyde, glutardialdehyde, maleic dialdehyde, and phthaldialdehyde; an amino-formaldehyde resin such as a condensate of formaldehyde with methylol urea, methylol melamine, alkylated methylol urea, alkylated methylated melamine, acetoguanamine, or benzoguanamine; and salts of divalent or trivalent metals such as sodium, potassium, magnesium, calcium, aluminum, iron, and nickel and oxides thereof. A melamine-based cross-linking agent is preferred as the cross-linking agent, and methylolmelamine is particularly preferred.

A mixing amount of the cross-linking agent is preferably 0.1 to 35 parts by weight, and more preferably 10 to 25 parts by weight with respect to 100 parts by weight of the polyvinyl alcohol-based resin. Meanwhile, for improving the durability, the cross-linking agent may be mixed within a range of more than 30 parts by weight and 46 parts by weight or less with respect to 100 parts by weight of the polyvinyl alcohol-based resin. In particular, in the case where the polyvinyl alcohol-based resin having an acetoacetyl group is used, the cross-linking agent is preferably used in an amount of more than 30 parts by weight. The cross-linking agent is mixed within a range of more than 30 parts by weight and 46 parts by weight or less, to thereby improve the water resistance.

Note that the above-mentioned polyvinyl alcohol-based adhesive can also contain a coupling agent such as a silane coupling agent or a titanium coupling agent, various kinds of tackifiers, a UV absorber, an antioxidant, a stabilizer such as a heat-resistant stabilizer or a hydrolysis-resistant stabilizer.

In the coating layer of the polarizer protective film of the present invention, a side of the polarizer protective film of the present invention on which the polarizer is provided can be subjected to easy adhesion processing for the purpose of enhancing the adhesion. Examples of the easy adhesion processing include surface treatment such as corona treatment, plasma treatment, low-pressure UV treatment, and saponification.

It is preferred to form an easy adhesion layer so as to enhance adhesion, which is on a side of the polarizer protective film of the present invention on which the polarizer is provided.

As the easy adhesion layer, for example, there is a silicone layer having a reactive functional group. Examples of a material for the silicone layer having a reactive functional group are not particularly limited but include alkoxysilanols containing an isocyanate group, alkoxysilanols containing an amino group, alkoxysilnaols containing a mercapto group, alkoxysilanols containing carboxyl group, alkoxysilanols containing an epoxy group, alkoxysilanols containing a vinyl-type unsaturated group, alkoxysilanols containing a halogen group, and alkoxysilanols containing an isocyanate group, and amino-based silanol is preferred. Further, by adding a titanium-based catalyst or a tin-based catalyst for allowing the above-mentioned silanol to be reacted efficiently, the adhesive strength can be enhanced. Other additives may be added to the above-mentioned silicone containing a reactive functional group. Specifically, a tackifier such as a terpene resin, a phenol resin, a terpene-phenol resin, a rosin resin, or a xylene resin, a UV absorber, an antioxidant, a stabilizer such as a heat-resistant stabilizer may be used.

The above-mentioned silicone layer having a reactive functional group is formed by coating and drying by a known technology. The thickness of the silicone layer after drying is preferably 1 to 100 nm and more preferably 10 to 80 nm.

During coating, silicone having a reactive functional group may be diluted with a solvent. An example of a dilution solvent is not particularly limited but includes alcohols. The dilution concentration is not particularly limited but is preferably 1 to 5% by weight, and more preferably 1 to 3% by weight.

The above-mentioned adhesive layer is formed by applying the above-mentioned adhesive on either side or both sides of a polarizer protective film, and on either side or both sides of a polarizer. After the polarizer protective film and the polarizer are attached to each other, a drying step is performed, to thereby form an adhesive layer made of an applied dry layer. After the adhesive layer is formed, the polarizer and the polarizer protective film may also be attached to each other. The polarizer and the polarizer protective film may be attached to each other with a roll laminator or the like. The heat-drying temperature and the drying time are appropriately determined depending upon the kind of an adhesive.

The thickness of the adhesive layer is preferably 0.01 to 10 µm, and more preferably 0.03 to 5 µm.

The polarizing plate according to the present invention may have a pressure-sensitive adhesive layer as at least one of an outermost layer (such a polarizing plate may be referred to as pressure-sensitive adhesion type polarizing plate). As a particularly preferred embodiment, a pressure-sensitive adhesive layer for bonding of other members such as another optical film and a liquid crystal cell can be provided to a side on which the polarizer of the polarizer protective film is not attached.

The pressure-sensitive adhesive forming the above-mentioned pressure-sensitive adhesive layer is not particularly limited. For example, a pressure-sensitive adhesive containing a polymer such as an acrylic polymer, a silicone-based polymer, polyester, polyurethane, polyamide, polyether, or a fluorine or rubber-based polymer as a base polymer can be appropriately selected to be used. In particular, a pressure-sensitive adhesive such as an acrylic pressure-sensitive adhesive is preferably used, which is excellent in optical transparency, exhibits appropriate wettability and pressure-sensitive adhesion properties of a cohesive property and an adhesion, and is excellent in weather resistance and heat resistance. In particular, an acrylic pressure-sensitive adhesive made of an acrylic polymer containing 4 to 12 carbon atoms is preferred.

In addition to the above, in terms of the prevention of a foaming phenomenon and a peeling phenomenon caused by moisture absorption, the prevention of a degradation in optical properties and bending of a liquid crystal cell caused by thermal expansion difference or the like, and the formation property of a liquid crystal display apparatus which is of high quality and has excellent durability, for example, a pressure-sensitive adhesive layer having a low moisture absorbing ratio and excellent heat resistance is preferred.

The above-mentioned pressure-sensitive adhesive layer may contain, for example, resins of a natural substance or a synthetic substance, in particular, such as a tackifying resin, a filler formed of glass fibers, glass beads, metal powders, or other inorganic powders, and an additive such as a pigment, a colorant, and an antioxidant.

Further, a pressure-sensitive adhesive layer that contains fine particles and exhibits a light diffusion property may be used, for example.

The above-mentioned pressure-sensitive adhesive layer can be provided by any appropriate method. Examples thereof include a method of preparing a pressure-sensitive adhesive solution in an amount of about 10 to 40% by weight in which a base polymer or a composition thereof is dissolved or dispersed in a solvent containing any appropriate solvent such as toluene or ethyl acetate alone or in a mixture, and directly applying the pressure-sensitive adhesive solution onto a polarizing plate or an optical film by any appropriate development method such as a flow casting method or a coating method, or forming a pressure-sensitive adhesive layer on a separator according to the above, and moving the pressure-sensitive adhesive layer to the polarizer protective film surface.

The pressure-sensitive adhesive layer may also be provided on one surface or both surfaces of a polarizing plate as superimposed layers of different compositions, different kinds, or the like. Further, in the case of providing the pressure-sensitive adhesive layer on both surfaces of the polarizing plate, pressure-sensitive adhesive layers on front and reverse surfaces of the polarizing plate can have different compositions, kinds, thicknesses, and the like.

The thickness of the pressure-sensitive adhesive layer can be determined appropriately in accordance with the use purpose and the adhesive strength, and is preferably 1 to 40 µm, more preferably 5 to 30 µm, and particularly preferably 10 to 25 µm. When the thickness of the pressure-sensitive adhesive layer is smaller than 1 µm, durability of the layer degrades. Further, when the thickness of the pressure-sensitive adhesive layer is larger than 40 µm, lifting and peeling are likely to occur due to foaming or the like, resulting in an unsatisfactory outer appearance.

In order to enhance the contactness between the above-mentioned polarizer protective film and the above-mentioned pressure-sensitive adhesive layer, an anchor layer can also be provided therebetween.

As the anchor layer, preferably, an anchor layer selected from polyurethane, polyester, and polymers containing amino groups in molecules is used, and in particular, polymers containing amino groups in molecules are preferably used. In the polymer containing an amino group in molecules, an amino group in the molecules reacts with a carboxyl group in the pressure-sensitive adhesive or a polar group in a conductive polymer, or exhibits an interaction such as an ion interaction, so satisfactory contactness is ensured.

Examples of the polymers containing amino groups in molecules include polyethyleneimine, polyallylamine, polyvinylamine, polyvinylpyridine, polyvinylpyrrolidine, and a polymer of an amino group-containing monomer such as dimethylaminoethyl acrylate shown in the above-mentioned copolymerized monomer of the acrylic pressure-sensitive adhesive.

In order to provide the above-mentioned anchor layer with an antistatic property, an antistatic agent can also be added. Examples of the antistatic agent for providing an antistatic property include ionic surfactants, conductive polymers such as polyaniline, polythiophene, polypyrrole, and polyquinoxaline, and metal oxides such as tin oxide, antimony oxide, and indium oxide. Particularly, in view of optical properties, an outer appearance, an antistatic effect, and stability of an antistatic effect under heat or humidity, the conductive polymers are used preferably. Of those, a water-soluble conductive polymer such as polyaniline and polythiophene, or a water-dispersion conductive polymer is particularly preferably used. The reason for this is as follows: in the case of using the water-soluble conductive polymer or the water-dispersion conductive polymer as a material for forming an antistatic layer, the deterioration of an optical film base caused by an organic solvent can be suppressed in the process of coating.

Note that, in the present invention, the polarizer, the polarizer protective film, and the like forming the above-mentioned polarizing plate, and each layer such as the pressure-sensitive adhesive layer may be provided with a UV absorbing ability, for example, by the treatment with a UV absorbing agent such as a salicylate-based compound, a benzophenole-based compound, a benzotriazole-based compound, a cyanoacrylate-based compound, and a nickel complex salt-based compound.

The polarizing plate of the present invention may be provided on either one of a viewer side and a backlight side of a liquid crystal cell or on both sides thereof without particular limitation.

[Image Display Apparatus]

Figure 2:
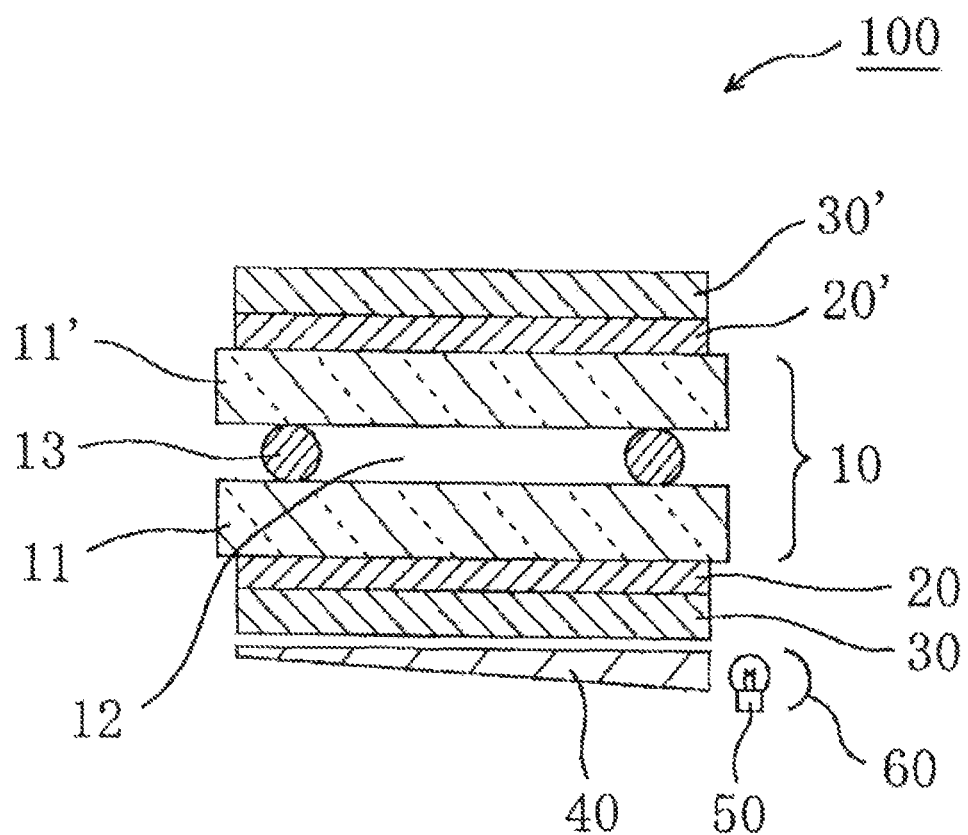
FIG. 2 A schematic cross-sectional view of a liquid crystal display apparatus according to a preferred embodiment of the present invention.

Next, an image display apparatus of the present invention will be described. The image display apparatus of the present invention includes at least one polarizing plate of the present invention. Here, as one example, a liquid crystal display apparatus will be described. However, it is needless to say that the present invention is applicable to any display apparatus requiring a polarizing plate. Specific examples of the image display apparatus to which the polarizing plate of the present invention is applicable include a self-emitting display apparatus such as an electroluminescence (EL) display, a plasma display (PD), and a field emission display (FED). FIG. 2 is a schematic cross-sectional view of a liquid crystal display apparatus according to a preferred embodiment of the present invention. In the illustrated example, a transmission-type liquid crystal display apparatus will be described. However, it is needless to say that the present invention is also applicable to a reflection-type liquid crystal display apparatus or the like.

A liquid crystal display apparatus 100 includes a liquid crystal cell 10, retardation films 20 and 20' placed so as to interpose the liquid crystal cell 10 therebetween, polarizing plates 30 and 30' placed on outer sides of the retardation films 20 and 20', a light guide plate 40, a light source 50, and a reflector 60. The polarizing plates 30 and 30' are placed so that polarization axes thereof are perpendicular to each other. The liquid crystal cell 10 includes a pair of glass substrates 11 and 11' and a liquid crystal layer 12 as a display medium placed between the substrates. One glass substrate 11 is provided with a switching element (typically, TFT) for controlling the electrooptical properties of liquid crystals, a scanning line for providing a gate signal to the switching element, and a signal line for providing a source signal to the switching element (all of them are not shown). The other glass substrate 11' is provided with a color layer forming a color filter and a shielding layer (black matrix layer) (both of them are not shown). A distance (cell gap) between the glass substrates 11 and 11' is controlled by a spacer 13. In the liquid crystal display apparatus of the present invention, the polarizing plate of the present invention described above is employed as at least one of the polarizing plates 30 and 30'.

For example, in the case of the liquid crystal display apparatus 100 employing a TN mode, liquid crystal molecules of the liquid crystal layer 12 are aligned in a state with respective polarization axes being shifted by 90° during application of no voltage. In such a state, injected light including light in one direction transmitted through the polarizing plate is twisted 90° by the liquid crystal molecules. As described above, the polarizing plates are arranged such that the respective polarization axes are perpendicular to each other, and thus light (polarized light) reaching the other polarizing plate transmits through the polarizing plate. Thus, during application of no voltage, the liquid crystal display apparatus 100 provides a white display (normally white mode). Meanwhile, in the case where a voltage is applied onto the liquid crystal display apparatus 100, alignment of the liquid crystal molecules in the liquid crystal layer 12 changes. As a result, the light (polarized light) reaching the other polarizing plate cannot transmit through the polarizing plate, and a black display is provided. Displays are switched as described above by pixel by using the active element, to thereby form an image.

EXAMPLES

Hereinafter, the present invention will be described specifically with reference to Examples, but the present invention is not limited to Examples. Unless otherwise noted, parts and % in Examples are based on weight.

<Weight Average Molecular Weight>

The weight average molecular weight was measured in polystyrene conversion, using Shodex GPC system-21H manufactured by Showa Denko K.K.

<Tg (Glass Transition Temperature, which May be Referred to as TG)>

A polymer was once dissolved in tetrahydrofuran, and the resultant solution was placed in excessive hexane or toluene, followed by reprecipitation and filtration. The precipitant thus obtained was subjected to vacuum drying (80° C./1 mmHg (1.33 hPa), 3 or more hours), to thereby remove a volatile constituent. The obtained resin was measured for a Tg, using a DSC apparatus (DSC 8230 manufactured by Rigaku Co., Ltd.).

<Dealcoholization Reaction Rate (Lactone Cyclization Rate)>

The dealcoholization reaction rate was determined from the weight reduction caused by a dealcoholization reaction from 150° C., which is prior to the starting of the weight reduction, to 300° C., which is prior to the starting of the decomposition of a polymer, by dynamic TG measurement, based on the weight reduction amount occurring at a time when all the hydroxyl groups are dealcoholized as methanol from a polymer composition obtained in polymerization.

More specifically, the weight reduction rate from 150° C. to 300° C. by the dynamic TG measurement of a polymer having a lactone ring system is measured, and the obtained measured weight reduction rate is defined as (X). On the other hand, the theoretical weight reduction rate (i.e., the weight reduction rate calculated assuming that 100% dealcoholization reaction occurred on the composition) assuming that all the hydroxyl groups contained in the polymer composition participate in the formation of a lactone ring to become alcohol, resulting in dealcoholization, from the polymer composition, is defined as (Y). Note that, more specifically, the theoretical weight reduction rate (Y) can be calculated from a molar ratio of a material monomer having a structure (hydroxyl group) participating in a dealcoholization reaction in a polymer, that is, the content of the material monomer in the polymer composition. Those values (X, Y) are substituted into a dealcoholization calculation expression:

1−(measured weight reduction rate(X)/theoretical weight reduction rate(Y)),and the obtained value is expressed by %,to thereby obtain a dealcoholization reaction rate(lactone cyclization rate).

<Melt Flow Rate>

The melt flow rate was measured at a test temperature of 240° C. and a load of 10 kg based on JIS-K6874.

<Rework Test>

A pressure-sensitive adhesive type polarizing plate was attached to a glass plate of a liquid crystal cell to obtain a test sample. The test sample was peeled from one corner in a diagonal direction at an angle of 90° at a speed of 1 mm/sec., and a peeled position was checked. The determination was conducted as follows.

○: Peeled at an interface between the pressure-sensitive adhesive and the glass plate without breaking the polarizing plate.

x: Peeled at an interface between the polarizer protective film and the polarizer.

Production Example 1

Production of Polarizer

A polyvinyl alcohol film with a thickness of 80 μm was dyed in 5% by weight of an iodine aqueous solution (weight ratio: iodine/potassium iodide=1/10). Then, the resultant polyvinyl alcohol film was soaked in an aqueous solution containing 3% by weight of boric acid and 2% by weight of potassium iodide. Further, the polyvinyl alcohol film was stretched by 5.5 times in an aqueous solution containing 4% by weight of boric acid and 3% by weight of potassium iodide, and thereafter, the polyvinyl alcohol film was soaked in 5% by weight of a potassium iodide aqueous solution. After that, the polyvinyl alcohol film was dried in an oven at 40° C. for 3 minutes to obtain a polarizer with a thickness of 30 μm.

Production Example 2

Production of (Meth)Acrylic Resin

In a 30-L reaction vessel equipped with a stirring device, a temperature sensor, a cooling pipe, and a nitrogen introduction pipe, 8,000 g of methyl methacrylate (MMA), 2,000 g of methyl 2-(hydroxymethyl)acrylate (MHMA), and 10,000 g of toluene were placed, and the mixture was heated to 105° C. while nitrogen was being introduced thereto. After reflux, while 10.0 g of tert-amylperoxy isononanoate (Lupasol 570 (trade name) manufactured by Atofina Yoshitomi Ltd.) was added as an initiator, and at the same time, a solution containing 20.0 g of an initiator and 100 g of toluene were dropped over 4 hours, the mixture was subjected to solution polymerization under reflux (about 105 to 110° C.), and further aged over 4 hours.

To the resultant polymer solution, 10 g of a stearyl phosphoate/distearyl phosphoate mixture (Phoslex A-18 (trade name) manufactured by Sakai Chemical Industry Co., Ltd.) was added, and the polymer solution was subjected to cyclization condensation reaction under reflux (about 90 to 110° C.) for 5 hours. Then, the polymer solution obtained in the above cyclization condensation reaction was introduced to a bent-type screw biaxial extruder (Φ=29.75 mm, L/D=30) of a barrel temperature of 260° C., a rotation number of 100 rpm, a decompression degree of 13.3 to 400 hPa (10 to 300 mmHg), one rear bent, and four fore bents, at a processing speed of 2.0 kg/time in resin amount conversion. The polymer solution was subjected to cyclization condensation reaction and devolatilization in the extruder and extruded, to thereby obtain a transparent (meth)acrylic resin pellet.

In the obtained (meth)acrylic resin pellet, the lactone cyclization rate was 97.0%, the weight average molecular weight was 147,700, the melt flow rate was 11.0 g/10 minutes, and the Tg (glass transition temperature) was 130° C.

Production Example 3

Preparation of Polyvinyl Alcohol-Based Adhesive Aqueous Solution

A polyvinyl alcohol-based adhesive aqueous solution was prepared by adding an aqueous solution containing 20 parts by weight of methylol melamine with respect to 100 parts by weight of a polyvinyl alcohol resin modified with a acetoacetyl group (acetylation degree: 13%) so as to be a concentration of 0.5% by weight.

Example 1

Polarizer Protective Film

The (meth)acrylic resin obtained in Production Example 2 was supplied to an extruder and melt-kneaded at 250° C. Then, the (meth)acrylic resin was extruded from a T-die, water-cooled with a cooling roll, and taken up to obtain a film with a thickness of 100 μm. After that, the film was stretched longitudinally 1.8-fold (heating temperature: 140° C.) and stretched laterally 2.4-fold by a sequential biaxial extruder, whereby a biaxially stretched film with a thickness of 30 μm was obtained.

Further, the (meth)acrylic resin obtained in Production Example 2 was dissolved in a mixed solvent of methyl isobutyl ketone (MIBK)/methyl ethyl ketone (MEK)=7/3 to prepare an application liquid. The concentration of the (meth) acrylic resin in the application liquid was 3% by weight. Next, the prepared application liquid was applied to one surface of the biaxially stretched film obtained in the above with a wire bar and air-dried at room temperature. The thickness of the coating layer formed by coating was 1 μm. Thus, a polarizer protective film (1A) was obtained.

(Formation of Easy Adhesion Layer)

A solution prepared by adding 66.7 parts of isopropyl alcohol with respect to 100 parts of a silane coupling agent (APZ-6601 (trade name) manufactured by Toray Dow Corning Silicone Co., Ltd.) was applied onto one of surfaces of the polarizer protective film (1A) obtained in the above using a wire bar #5, followed by drying at 90° C. for 2 minutes. The thickness of an easy adhesion layer after evaporation was 50 nm.

(Production of Polarizing Plate)

The polarizer protective film (1A) was attached to the polarizer obtained in Production Example 1 so that the easy adhesion layer surface came into contact with one surface of the polarizer and saponified triacetyl cellulose (T-40UZ (tradename) manufactured by Fuji Photo Film Co., Ltd.) came into contact with the other surface of the polarizer, using the polyvinyl alcohol based adhesive aqueous solution prepared in Production Example 3. The polyvinyl alcohol based adhesive aqueous solution was applied to each of the easy adhesion surface side of the polarizer protective film (1A) and the triacetyl cellulose side thereof, followed by drying at 70° C. for 10 minutes to obtain a polarizing plate (1B).

(Formation of Pressure-Sensitive Adhesive)

As a base polymer, a solution (solid content: 30%) containing an acrylic polymer with a weight average molecular weight of 2,000,000 made of a copolymer of butyl acrylate: acrylic acid:2-hydroxyethyl acrylate=100:5:0.1 (weight ratio) was used. To the acrylic polymer solution, 4 parts of COLONATE L manufactured by Nippon Polyurethane Co., Ltd., which was an isocyanate-based polyfunctional compound, 0.5 part of an additive (KBM 403 manufactured by Shin-Etsu Chemical Co., Ltd.), and a solvent (ethyl acetate) for adjusting the viscosity were added with respect to 100 parts of a polymer solid content, to thereby prepare the pressure-sensitive adhesive solution (solid content: 12%). The pressure-sensitive adhesive solution was applied onto a releasing film (polyethylene terephthalate base material: Dia Foil MRF38 manufactured by Mitsubishi Chemical Polyester Film Co., Ltd.), followed by drying in a hot-air circulation type oven, to thereby form a pressure-sensitive layer.

(Polarizing Plate Anchor Layer)

A polyethyleneimine adduct of polyacrylate (Polyment NK380 manufactured by Nippon Shokubai Co., Ltd.) was diluted 50-fold with methylisobutylketone. The resultant was applied onto one surface of the polarizing plate (1B) using a wire bar #5 so that the thickness after drying was 50 nm, followed by drying.

(Production of a Pressure-Sensitive Adhesive Type Polarizing Plate)

A releasing film with the above-mentioned pressure-sensitive adhesive layer formed thereon was attached to the anchor layer formed on the polarizing plate (1B), to thereby produce a pressure-sensitive adhesive type polarizing plate (1C).

(Evaluation of Polarizing Plate)

The adhesion between the polarizer protective film and the polarizer in the obtained polarizing plate was evaluated by a rework test. The result of the evaluation was ○, and the polarizer protective film and the polarizer were peeled off from each other at an interface between the pressure-sensitive adhesive and the glass plate without breaking the polarizing plate (1B).

Comparative Example 1

A polarizer protective film (C1A), a polarizing plate (C1B), and a pressure-sensitive adhesive type polarizing plate (C1C) were produced in the same way as in Example 1 except that a coating layer was not provided on the polarizer protective film.

(Evaluation of Polarizing Plate)

The adhesion between the polarizer protective film and the polarizer in the obtained polarizing plate was evaluated by a rework test. The result of the evaluation was x, and peeling occurred at an interface between the polarizer protective film (C1A) and the polarizer. When peeling surfaces were analyzed, a component of the (meth)acrylic resin obtained in Production Example 2 was detected from both surfaces, and hence, it was conjectured that cohesive failure occurred in the vicinity of the surface of the polarizer protective film (C1A).

Example 2

In a 30-L reaction vessel equipped with a stirring device, a temperature sensor, a cooling pipe, and a nitrogen introduction pipe, 8,000 g of methyl methacrylate (MMA) and 10,000 g of toluene were placed, and the mixture was heated to 105° C. while nitrogen was being introduced thereto. After reflux, while 10.0 g of tert-amylperoxy isononanoate (Lupasol 570 (trade name) manufactured by Atofina Yoshitomi Ltd.) was added as an initiator, and at the same time, a solution containing 20.0 g of an initiator and 100 g of toluene was dropped over 4 hours, the mixture was subjected to solution polymerization under reflux (about 105 to 110° C.), and further aged over 4 hours.

The obtained polymer solution was introduced into a bent-type screw biaxial extruder (Φ=29.75 mm, L/D=30) with one rear bent and four bents at a barrel temperature of 260° C., a rotation number of 100 rpm, a decompression degree of 13.3 to 400 hPa (10 to 300 mmHg) at a processing rate of 2.0 kg/hour in terms of a resin amount and extruded to obtain a pellet of a transparent (meth)acrylic resin.

The weight average molecular weight of the obtained (meth)acrylic resin was 100,000, the melt flow rate thereof was 18.0 g/10 minutes, and Tg (glass transition temperature) thereof was 110° C.

A polarizer protective film (2A), a polarizing plate (2B), and a pressure-sensitive adhesive type polarizing plate (2C) were produced in the same way as in Example 1 except for using the (meth)acrylic resin obtained as described above in place of the (meth)acrylic resin obtained in Production Example 2 in Example 1.

(Evaluation of Polarizing Plate)

The adhesion between the polarizer protective film and the polarizer in the obtained polarizing plate was evaluated by a rework test. The result of the evaluation was ○, and the polarizer protective film and the polarizer were peeled off from each other at an interface between the pressure-sensitive adhesive and the glass plate without breaking the polarizing plate (2B).

INDUSTRIAL APPLICABILITY

The polarizer protective film and the polarizing plate of the present invention can be preferably used for various kinds of image display apparatuses (liquid crystal display apparatus, organic EL display apparatus, PDP, etc.).

The invention claimed is:

1. A polarizing plate comprising:
   a polarizer;
   an adhesive layer above the polarizer, wherein the adhesive layer is formed of polyvinyl alcohol-based adhesive;
   an easy adhesion layer above the adhesive layer, wherein the easy adhesion layer is formed of silicone having a reactive functional group; and
   a polarizer protective film above the easy adhesion layer, the polarizer protective film comprising:
      a film containing a (meth)acrylic resin (A) having a lactone ring system as a main component; and
      a coating layer containing a (meth)acrylic resin (B) as a main component provided on at least one surface of the film, wherein the (meth)acrylic resin (A) has a lactone cyclization rate of 97.0%.

2. A polarizing plate according to claim 1, comprising a cellulose-based resin film on a surface side of the polarizer opposite to the polarizer protective film.

3. A polarizing plate according to claim 1, further comprising a pressure-sensitive adhesive layer as at least one of an outermost layer.

4. A polarizing plate according to claim 1, wherein a thickness of the coating layer is 0.005 μm to 3 μm.

5. A polarizing plate according to claim 1, wherein the film containing a (meth)acrylic resin (A) as a main component is obtained by melt-extrusion.

6. A polarizing plate according to claim 1, wherein the coating layer is obtained by applying an application liquid obtained by dissolving a (meth)acrylic resin (B) in a solvent.

7. A polarizing plate according to claim 1, wherein the reactive functional group of the easy adhesion layer includes isocyanate group.

8. An image display apparatus comprising at least one polarizing plate according to claim 1.

9. A polarizing plate, comprising:
   a polarizer;
   an adhesive layer above the polarizer, wherein the adhesive layer is formed of polyvinyl alcohol-based adhesive;
   an easy adhesion layer above the adhesive layer, wherein the easy adhesion layer is formed of silicone having a reactive functional group; and
   a polarizer protective film above the easy adhesion layer, the polarizer protective film comprising:
      a film containing a (meth)acrylic resin (A) having a lactone ring system as a main component; and a coating layer containing a (meth)acrylic resin (B) as a main component provided on at least one surface of the film, wherein the (meth)acrylic resin (A) is obtained by cyclization condensation reaction from a polymer of monomers comprising methyl methacrylate and methyl 2-(hydroxymethyl)acrylate.

10. A polarizing plate according to claim 9, wherein the reactive functional group of the easy adhesion layer includes isocyanate group.

* * * * *